(12) United States Patent
Bleeker et al.

(10) Patent No.: US 12,249,335 B2
(45) Date of Patent: Mar. 11, 2025

(54) TECHNIQUES FOR PROVIDING NATURAL LANGUAGE UNDERSTANDING (NLU) SERVICES TO CONTACT CENTERS

(71) Applicant: CDW LLC, Vernon Hills, IL (US)

(72) Inventors: Casey Bleeker, Denver, CO (US); Nathan A. Cartwright, Cincinnati, OH (US); Shawn Augenstein, Littleton, CO (US)

(73) Assignee: CDW LLC, Vernon Hills, IL (US)

( * ) Notice: Subject to any disclaimer, the term of this patent is extended or adjusted under 35 U.S.C. 154(b) by 293 days.

(21) Appl. No.: 17/854,965

(22) Filed: Jun. 30, 2022

(65) Prior Publication Data

US 2024/0005925 A1    Jan. 4, 2024

(51) Int. Cl.
*G10L 15/30* (2013.01)
*H04L 9/40* (2022.01)

(52) U.S. Cl.
CPC .......... *G10L 15/30* (2013.01); *H04L 63/0428* (2013.01)

(58) Field of Classification Search
CPC ............................ G10L 15/30; H04L 63/0428
USPC ........................................................ 704/201
See application file for complete search history.

(56) References Cited

U.S. PATENT DOCUMENTS 9,794,511 B1 * 10/2017 McQueen ............... H04N 7/142
9,911,398 B1 * 3/2018 McQueen ............. G06F 3/0481
10,171,659 B2 1/2019 Riahi et al.
10,262,261 B2 * 4/2019 Sanchez ................... G06N 5/02
10,547,747 B1 1/2020 Agarwal et al.
(Continued)

FOREIGN PATENT DOCUMENTS

| CN | 112650475 A | 4/2021 | |
|---|---|---|---|
| WO | WO-2021/108163 A1 | 6/2021 | |
| WO | WO-2024006179 A1 * | 1/2024 | ............ H04M 3/527 |

OTHER PUBLICATIONS

C. Yoon, "Streaming based high-quality media convergence service provision for home appliances," The 18th IEEE International Symposium on Consumer Electronics (ISCE 2014), Jeju, Korea (South), 2014, pp. 1-2, doi: 10.1109/ISCE.2014.6884303. keywords: {Media;Home appliances;Servers;Convergence;Cloud co (Year: 2014).*
(Continued)

*Primary Examiner* — Bharatkumar S Shah
(74) *Attorney, Agent, or Firm* — MARSHALL, GERSTEIN & BORUN LLP; Randall G. Rueth

(57) ABSTRACT

Techniques for providing natural language understanding (NLU) services to contact centers are disclosed herein. An example method includes receiving, at a cloud NLU connector, a data stream from a contact center that includes an audio stream, extracting the audio stream from the data stream, and transmitting the audio stream through a secure network to a cloud-based NLU hub. The cloud-based NLU hub is communicatively coupled to a plurality of cloud-based NLU service providers and stores a plurality of user NLU profiles that each designate one or more cloud-based NLU service providers to provide NLU services. The example method further includes determining one or more designated cloud-based NLU service providers to provide at least one NLU service corresponding to the audio stream, and causing the one or more designated cloud-based NLU service providers to process the audio stream in accordance with the at least one NLU service.

20 Claims, 3 Drawing Sheets

(56) References Cited

U.S. PATENT DOCUMENTS

| | | | |
|---|---|---|---|
| 10,623,246 B1* | 4/2020 | Iyer | H04L 12/2832 |
| 10,802,951 B2 | 10/2020 | Falko | |
| 11,108,618 B2 | 8/2021 | Busbee et al. | |
| 11,736,616 B1* | 8/2023 | Rigby | H04M 3/5175 |
| | | | 379/265.13 |
| 2012/0117112 A1* | 5/2012 | Johnston | G06F 16/9537 |
| | | | 707/E17.078 |
| 2018/0211509 A1* | 7/2018 | Ramaci | A61J 7/0481 |
| 2019/0244613 A1* | 8/2019 | Jonas | H04M 3/527 |
| 2020/0279180 A1 | 9/2020 | Yu et al. | |
| 2021/0099546 A1 | 4/2021 | Licata et al. | |
| 2021/0134283 A1* | 5/2021 | Adibi | H04M 3/5166 |
| 2021/0136207 A1 | 5/2021 | Adibi et al. | |
| 2021/0182174 A1 | 6/2021 | Velammal et al. | |
| 2021/0281684 A1 | 9/2021 | Kadakia et al. | |

OTHER PUBLICATIONS

C. Yoon, "Streaming based high-quality media service architecture and methods," 2013 International Conference on ICT Convergence (ICTC), Jeju, Korea (South), 2013, pp. 724-725, doi: 10.1109/ICTC.2013.6675462. keywords: {Media;Cloud computing;Servers;IPTV;Games;Cloud computing;Cloud Streaming}, (Year: 2013).*

C. Yoon, "Streaming based high-quality media convergence service provision for home appliances," The 18th IEEE International Symposium on Consumer Electronics (ISCE 2014), Jeju, Korea (South), 2014, pp. 1-2, doi: 10.1109/ISCE.2014.6884303. keywords: {Media; Home appliances; Servers; Convergence;Clou (Year: 2014).*

C. Yoon, "Streaming based high-quality media service architecture and methods," 2013 International Conference on ICT Convergence (ICTC), Jeju, Korea (South), 2013, pp. 724-725, doi: 10.1109/ICTC.2013.6675462. keywords: {Media;Cloud computing; Servers;IPTV;Games;Cloud computing; Cloud Streaming}, (Year (Year: 2013).*

A. Toshniwal, K. S. Rathore, A. Dubey, P. Dhasal and R. Maheshwari, "Media Streaming in Cloud with Special Reference to Amazon Web Services: A Comprehensive Review," 2020 4th International Conference on Intelligent Computing and Control Systems (ICICCS), Madurai, India, 2020, pp. 368-372, doi: 10.110 (Year: 2020).*

International Application No. PCT/US2023/026184, International Search Report and Written Opinion, mailed Sep. 29, 2023.

Chaloyan, Google Dialogflow Plugin, Administrator Guide, Universal Speech Solutions LLC, UniMRCP, Last updated Mar. 16, 2021.

Chaloyan, Google Dialogflow Plugin, Administrator Guide, Universal Speech Solutions LLC, UniMRCP, Last updated Mar. 8, 2021.

Media Resource Control Protocol (MRCP), Universal Speech Solutions LLC, downloaded from the Internet at: <https://www.unimrcp.org> Nov. 17, 2021.

Chaloyan, UniMRCP Installation Manual Developer Guide, Universal Speech Solutions LLC, last updated Apr. 4, 2020.

Second Written Opinion for International Application No. PCT/US2023/026184, dated May 8, 2024.

* cited by examiner

TECHNIQUES FOR PROVIDING NATURAL LANGUAGE UNDERSTANDING (NLU) SERVICES TO CONTACT CENTERS

FIELD OF THE DISCLOSURE

The present disclosure is generally directed to contact center protocols and, more particularly, to techniques for providing NLU services to contact centers.

BACKGROUND

Today, many businesses rely on customer contact centers to manage conversations between customers (e.g., patients) and customer representatives. In the modern economic environment, cost-effectively serving and retaining customers is of paramount importance, especially as customer retention is generally less expensive than new customer acquisition. Accordingly, the customer contact center is a cornerstone to a successful business strategy.

Customer contact centers handle a large amount of interaction between customers (e.g., patients) and companies, through customer representatives. As the cost of a live agent is substantial, many businesses have shifted towards interactive voice response (IVR) technology and, more recently, virtual agents that can help offload the live agent to a simple, straightforward task to improve the efficiency of the call center. Through IVR, the interaction with the customer may be classified into a series of steps, which are delivered to the customer in an automated manner, such as a pre-recorded script or multiple choice menus on a computer screen. Accordingly, certain information (e.g., the desired medical procedure or medical insurance account number, etc.) can be automatically obtained (e.g., via the telephone, a keypad, and/or a computer keyboard) before passing control to a live agent.

Virtual agents generally provide a greater set of customer interaction capabilities than IVR to more flexibly accommodate customer requests through a contact center without involving a live agent. More particularly, conventional virtual agents may mimic live agents using scripted rules in conjunction with artificial intelligence (AI) (e.g., automatic speech recognition (ASR)) to provide automated service over the phone or on a webpage. Further, these conventional virtual agents may utilize machine learning (ML) to learn from past interactions with customers to generally improve their customer service experience over time. However, conventional virtual agents (and contact centers, more generally) suffer from several drawbacks.

Namely, many conventional contact centers utilize legacy telephony protocols (e.g., media resource control protocol (MRCP), session initiation protocol (SIP)) to pass media (e.g., audio, video) to virtual agents for ASR processing on an on premise server/device. Typically, to integrate ASR functionality into the virtual agent, conventional contact centers fork the media through an integration gateway which transmits the media stream to the virtual agent and ASR engine for processing. This media forking isolates the media stream from the rest of the contact center, and as a result, if the media stream is thereafter transferred to a human agent, the data obtained by the virtual agent is irretrievably lost. Thus, if a user calling into a contact center to, for example, perform patient intake prior to a hospital visit, the user may first speak/interact with a virtual agent to obtain general patient information; and when the user is transferred to a human agent to complete the intake process, the human agent may not receive any of the user's information and may require the user to provide the information a second time.

Additionally, the media stream received at conventional contact centers is generally unencrypted due to difficulties traversing firewalls in such conventional contact centers. The media typically becomes mangled when encountering/traversing such firewalls, and as a result, the conventional ASR engines are less accurate and/or completely unable to interpret this mangled media data. However, the media stream is typically communicated across the public internet, such that the user's data is inherently placed at-risk when unencrypted. Further, encrypting media stream data across the public internet consistently results in latency issues for conventional contact centers. Thus, conventional systems generally suffer serious performance issues when the media data is encrypted, and expose private user information when the media data is unencrypted.

Moreover, conventional contact centers lack diversity of processing tools, and thereby suffer from limited media processing capabilities. The on premise ASR server/device typically includes a single, predetermined suite of speech recognition tools that are preconfigured to handle incoming media of only certain types. Users who manage such conventional contact centers often would benefit from media processing tools/packages that are not included in their on premise device, and additionally suffer from inconsistent and/or non-existent updates to their available speech recognition tools. In all, the on premise ASR servers/devices utilized by conventional contact centers provide insufficient, out-of-date processing resources that are unable to process a suitable variety of incoming media types.

Accordingly, there is a need for techniques for providing NLU services to contact centers to facilitate efficient, consistent, reliable, secure, and accurate media stream processing through a contact center.

SUMMARY

The embodiments described herein relate to, inter alia, techniques for providing natural language understanding (NLU) services to contact centers. Specifically, the present techniques enable efficient, consistent, reliable, secure, and accurate media stream processing by providing access to multiple NLU service providers for a contact center through a cloud-based NLU hub and cloud NLU connector. The cloud NLU connector may receive a data stream from a contact center, extract an audio stream, encrypt the audio stream, and transmit the encrypted audio stream to the cloud-based NLU hub across a secure network. The cloud-based NLU hub may then cause one or more of the NLU service providers to execute NLU services with respect to the received media stream, and may subsequently transmit results of the processing back to the contact center through the secure network for further interaction with a user. As referenced herein, an "NLU service" may generally include any set of executable instructions that enables machine reading comprehension through grammar and context. Accordingly, an "NLU service provider" may generally include a platform where such NLU services are hosted/stored.

The present techniques differ from traditional contact center media stream processing at least in that they (1) utilize modern NLU processing services instead of legacy ASR services, (2) perform media stream processing on a cloud-based platform (e.g., through the cloud NLU connector and cloud-based NLU hub) with access to multiple NLU service providers, unlike the single processing provider of conventional on premise systems, and (3) encrypt media data prior to transmitting the data across a secure network. As a result, the present techniques enable far greater processing capabilities for contact centers than conventional techniques through the diversity of modern NLU service providers available to process media streaming from the contact centers, enhance user data security relative to conventional techniques, and minimize the data loss often experienced by conventional systems.

Additionally, the present techniques minimize the deleterious effects resulting from out-of-date processing applications encountered in conventional systems by automatically updating NLU services from each of the NLU service providers connected to the cloud-based NLU hub. The present techniques utilize a centralized server approach that actively and dynamically pulls in updates/data corresponding to NLU service provider software, thereby eliminating the need of system administrators managing the contact center to manually update such software packages. In particular, this dynamic updating enables the present techniques to include the most up-to-date information, patches, software versions, etc. related to each NLU service provider's software for a user, at the time of the user's interaction with the contact center, without requiring access to each specific NLU provider's resources on an individual basis. Thus, users of the present techniques have affordable, user-friendly access to accurate, up-to-date, modern, real-time media stream processing services that were previously unavailable with conventional techniques.

Further, the present techniques enable customization of media stream processing resources to fit each individual system administrators' needs. For example, a first system administrator may ideally utilize a first media processing resource from service provider A and a second media processing resource from service provider B to provide a fully functioning contact center for the first system administrator's specific use-case. In conventional systems, the first system administrator would be unable to utilize both the first media processing resource and the second processing resource because they are provided by different service providers (e.g., A and B). Thus, the first system administrator would be forced to utilize a non-optimal processing resource to perform the function of either the first or second media processing resource, depending on which single service provider the system administrator chooses to use.

However, using the techniques of the present disclosure, the first system administrator would be able to utilize both the first media processing resource and the second media processing resource as the present techniques provide the first system administrator with a centralized platform from which each service provider may be accessed in any suitable capacity (e.g., entire suite of processing tools, single tool, etc.). The present techniques (e.g., the cloud NLU connector and cloud-based NLU hub) store user NLU profiles that each designate one or more cloud-based NLU service providers to provide NLU services. Consequently, the present techniques enable users to optimize the performance of contact center automated functionality (e.g., virtual agents) through the provisioning of multiple service providers, from which the user may select appropriate services in their user NLU profile based on the user's specific use-case.

Therefore, in accordance with the discussions herein, the present disclosure includes improvements to other technologies or technical fields at least because the present disclosure describes or introduces improvements in the field of real-time NLU data processing. Namely, the cloud NLU connector and cloud-based NLU hub executing on servers or other computing devices improves the field of real-time NLU data processing by introducing the capability to access and cause multiple NLU service providers to perform NLU services on a media stream (e.g., audio stream) in a manner that was previously unachievable using conventional techniques. This improves over conventional techniques at least because such techniques lack the ability to provide multiple NLU service providers for analysis of a media stream, and are otherwise simply not capable of causing multiple NLU service providers to perform NLU services on a media stream.

In addition, the present disclosure includes specific features other than what is well-understood, routine, conventional activity in the field, or adding unconventional steps that confine the claim to a particular useful application, e.g., determining, based on a user NLU profile of the plurality of user NLU profiles, one or more designated cloud-based NLU service providers of the plurality of cloud-based NLU service providers to provide at least one NLU service corresponding to the audio stream; and causing the one or more designated cloud-based NLU service providers to process the audio stream in accordance with the at least one NLU service, among others.

In another embodiment, the present techniques include a system for providing natural language understanding (NLU) services to contact centers. The system comprises: a cloud NLU connector configured to: receive a data stream from a contact center that includes an audio stream, extract the audio stream from the data stream, and transmit the audio stream through a secure network; and a cloud-based NLU hub that is communicatively coupled to a plurality of cloud-based NLU service providers and stores a plurality of user NLU profiles that each designate one or more cloud-based NLU service providers of the plurality of cloud-based NLU service providers to provide NLU services, wherein the cloud-based NLU hub is configured to: receive the audio stream through the secure network, determine, based on a user NLU profile of the plurality of user NLU profiles, one or more designated cloud-based NLU service providers of the plurality of cloud-based NLU service providers to provide at least one NLU service corresponding to the audio stream, and cause the one or more designated cloud-based NLU service providers to process the audio stream in accordance with the at least one NLU service.

In an embodiment, the present techniques include an artificial intelligence (AI) based method for providing natural language understanding (NLU) services to contact centers. The method comprises: receiving, at a cloud NLU connector, a data stream from a contact center that includes an audio stream; extracting, by the cloud NLU connector, the audio stream from the data stream; transmitting the audio stream through a secure network to a cloud-based NLU hub, wherein the cloud-based NLU hub is communicatively coupled to a plurality of cloud-based NLU service providers and stores a plurality of user NLU profiles that each designate one or more cloud-based NLU service providers of the plurality of cloud-based NLU service providers to provide NLU services; determining, by the cloud-based NLU hub and based on a user NLU profile of the plurality of user NLU profiles, one or more designated cloud-based NLU service providers of the plurality of cloud-based NLU service providers to provide at least one NLU service corresponding to the audio stream; and causing, by the cloud-based NLU hub, the one or more designated cloud-based NLU service providers to process the audio stream in accordance with the at least one NLU service.

In yet another embodiment, the present techniques include a non-transitory, computer-readable medium storing instructions thereon for providing natural language understanding (NLU) services to contact centers, the instructions comprising: instructions for receiving a data stream from a contact center that includes an audio stream; instructions for extracting the audio stream from the data stream; instructions for transmitting the audio stream through a secure network to a cloud-based NLU hub that is communicatively coupled to a plurality of cloud-based NLU service providers and stores a plurality of user NLU profiles that each designate one or more cloud-based NLU service providers of the plurality of cloud-based NLU service providers to provide NLU services; instructions for determining, based on a user NLU profile of the plurality of user NLU profiles, one or more designated cloud-based NLU service providers of the plurality of cloud-based NLU service providers to provide at least one NLU service corresponding to the audio stream; and instructions for causing the one or more designated cloud-based NLU service providers to process the audio stream in accordance with the at least one NLU service.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1A:
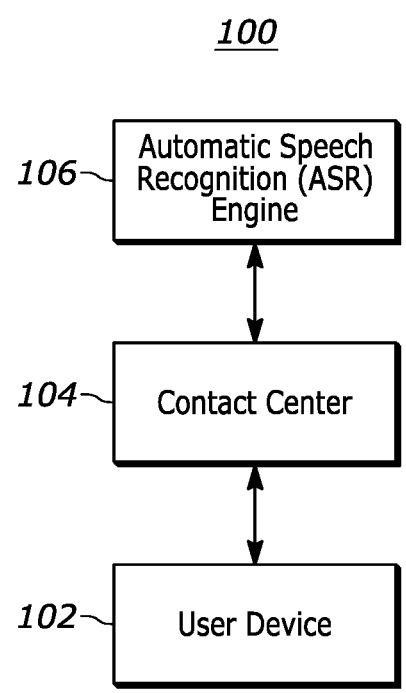
FIG. 1A depicts a prior art contact center configuration.

FIG. 1A depicts a prior art contact center configuration 100. For ease of discussion, the prior art contact center configuration 100 is a simplified representation of a conventional system for a user device 102 to interact with a contact center 104, which transmits/receives data from an automatic speech recognition (ASR) engine 106. Generally speaking, the user device 102 may be configured to initiate an audio stream to/from the contact center 104 through telephony-based communications. The contact center 104 may receive the incoming audio stream from the user device 102, and may pass the audio stream (or a portion thereof) to the ASR engine 106 for interpretation. The ASR engine 106 may interpret the audio stream and transmit the interpretations to the contact center 104, which may then determine subsequent responses for transmission to the user device 102.

The contact center 104 and the ASR engine 106 may generally be included on a single on premise device of the client/user that administers the contact center 104. As a result, the ASR engine 106 is limited to the ASR functionality included on the engine 106, and is typically incapable of handling user inputs/responses that are outside of the pre-programmed suite of known inputs. This limited interpretation capacity causes the prior art contact center configuration 100 to frequently not understand user inputs, misinterpret user inputs, and/or otherwise require clarification related to the user's inputs that can prolong calls with the contact center 104.

Moreover, many conventional contact center configurations, such as configuration 100, fork the incoming data stream to send the audio stream to the ASR engine 106. The ASR engine 106 may generate interpretations of the user inputs, and the contact center 104 may manage a conversation with the user device 102 accordingly. During this conversation, the contact center 104 may record data from the user inputs, which may be relevant to a purpose identified by the user when contacting the contact center 104 (e.g., patient intake for a hospital). When the contact center 104 concludes the conversation with the user device 102 and the ASR engine 106, the user may decide to transfer to a human agent (not shown) to continue the communication with the contact center 104. However, the contact center 104 may lose all data recorded during the conversation including the user device 102 and the ASR engine 106 when the contact center 104 transfers the user device 102 to a human agent. Thus, the human agent may be required to retake all information that the user previously provided during the conversation mediated by the contact center 104 including the user device 102 and the ASR engine 106, creating a very unsavory user experience and wasting processing resources corresponding to the ASR engine 106.

Exemplary Computing Environment

Figure 1B:
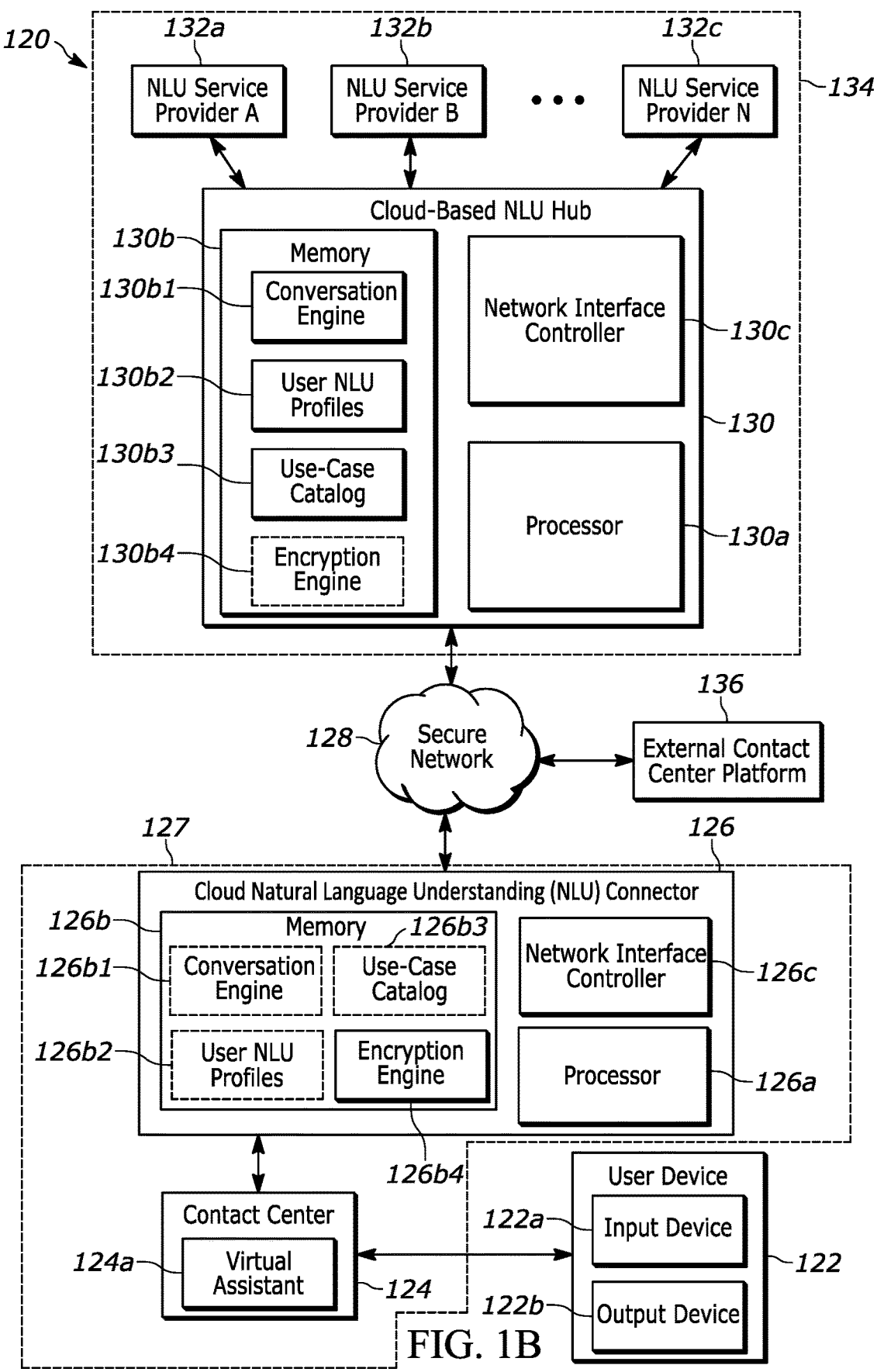
FIG. 1B depicts an exemplary computing environment in which techniques for providing natural language understanding (NLU) services to contact centers may be implemented, in accordance with embodiments described herein.

FIG. 1B depicts an exemplary computing environment 120 in which techniques for providing natural language understanding (NLU) services to contact centers may be implemented, in accordance with embodiments described herein. The environment 120 includes a user device 122, a contact center 124, a cloud NLU connector 126, a secure network 128, a cloud-based NLU hub 130, and NLU service providers 132a-c. Some embodiments may include a plurality of user devices 122, a plurality of contact centers 124, a plurality of cloud NLU connectors 126, a plurality of secure networks 128, and/or a plurality of NLU service providers 132a-c. As referenced herein, a "user" may indicate a person who is calling and/or otherwise contacting the contact center through the user device 122 as an outside third party (e.g., a patient contacting a hospital contact center), and/or may indicate a person who is a system administrator, owner, and/or otherwise associated with the configuration, operation, and maintenance of the contact center 124.

Generally, the user device 122 may include an input device 122a and an output device 122b. The input device 122a may include any suitable device or devices for receiving input, such as one or more microphone, one or more camera, a hardware keyboard, a hardware mouse, a capacitive touch screen, etc. The output device 122b may include any suitable device for conveying output, such as a hardware speaker, a computer monitor, a touch screen, etc. In some cases, the input device 122a and the output device 122b may be integrated into a single device, such as a touch screen device that accepts user input and displays output.

A user may generally utilize the user device to initiate and maintain a data stream with the contact center 124. When the user's call is initially received, the call may be transferred through to the contact center 124 by any suitable routing interface, such as a carrier trunking. Generally, such a carrier trunking may provide access to the contact center 124 for multiple users simultaneously by sharing a set of circuits, carriers, channels, frequencies, and/or in any other suitable manner such that the individual circuits/channels for each patient are not required. For example, the user's call may be transmitted to the carrier trunking using a public switched telephone network (PSTN), and the carrier trunking may connect the user's call to the contact center 124 using a session initiation protocol (SIP) in order to initiate, maintain, and eventually terminate the data stream.

In any event, when the user's call reaches the contact center 124, the contact center 124 may determine how to route and/or otherwise handle the user's call (e.g., immediately routed to a conversational AI (e.g., the conversation engine 126b1) for processing). More generally, the contact center 124 may moderate communications between the user device 102 and the cloud NLU connector 126. When a user calls and/or otherwise accesses the contact center 124 (e.g., online chat, social media, text messaging, etc.), the contact center 124 receives the inbound call from the user, and determines how to appropriately route and/or otherwise handle the user's call. The contact center 124 makes this determination using a virtual assistant 124a, which may interact with the user in conjunction with the conversation engine 126b1 and the NLU functionality provided by the combination of the cloud NLU connector 126, cloud-based NLU hub 130, and NLU service providers 132a-c.

In particular, the virtual assistant 124a may transmit each user input (e.g., voice input, keyboard input, etc.) to the cloud NLU connector 126, which may transmit the user input through the secure network 128 to the cloud-based NLU hub 130. When the user input reaches the cloud-based NLU hub 130, the hub 130 may access one or more of the NLU service providers 132a-c in order to provide NLU services related to the user input, such as textual transcription, intent interpretation, and/or any other suitable NLU service. The results of the NLU services may be transmitted to the conversation engine 126b1 in order to determine a response, and the response may be transmitted to the virtual assistant 124a. The virtual assistant 124a may then cause the output device 122b to display each response generated by the conversation engine 126b1 to the user. As such, the virtual assistant 124a may convey the responses from the conversation engine 126b1 and the NLU functionality provided by the combination of the cloud NLU connector 126, cloud-based NLU hub 130, and NLU service providers 132a-c to enable the user to determine how to proceed.

In any event, the cloud NLU connector includes a processor 126a, a memory 126b, and a network interface controller (NIC) 126c. The processor 126a may include any suitable number of processors and/or processor types, such as CPUs and one or more graphics processing units (GPUs). Generally, the processor 126a is configured to execute software instructions stored in a memory 126b. The memory 126b may include one or more persistent memories (e.g., a hard drive/solid state memory) and stores one or more set of computer executable instructions/modules, optionally including a conversation engine 126b1, user NLU profiles 126b2, a user-case catalog 126b3, and/or an encryption engine 126b4.

Each set of instructions stored in the memory 126b (and/or memory 130b) implement specific functionality. The conversation engine 126b1 may generally be an artificial intelligence (AI) trained conversational algorithm that is configured to interact with a user that is accessing the contact center 124. As a general example, when a user calls and/or otherwise accesses the contact center 124 (e.g., online chat, social media, text messaging, etc.), the user's verbal inputs/responses may be analyzed by the NLU service providers 132a-c to generate outputs, such as textual transcriptions and intent interpretations. The conversation engine 126b1 may receive the outputs (e.g., textual transcriptions and/or the intent interpretations) from the NLU service providers 132a-c to generate subsequent responses that are transmitted and displayed to the user (e.g., through the output device 122b).

As a more specific example, a user may utilize the user device 122 to call in to the contact center 124, and the user may proceed to verbally communicate their requests through the input device 122a (e.g., a microphone of the phone) for an appointment to receive a vaccination. These verbal inputs may be routed from the contact center 124 to the NLU service providers 132a-c by the cloud NLU connector 126 and cloud-based NLU hub 130 through the secure network 128, where the verbal inputs are analyzed to generate outputs (e.g., textual transcriptions, intent interpretations, etc.). The outputs may be forwarded to the conversation engine 126b1, which determines a subsequent response that may include asking the user to specify their location, so that the contact center 124 (e.g., via virtual assistant 124a) may retrieve service provider locations close to the user that offer the vaccination. The conversation engine 126b1 may repeatedly perform this response generation until the user terminates the data stream (e.g., hangs up the phone, disconnects from the website, etc.) and/or until the user receives and confirms a matching appointment that satisfies their requests, when the contact center 124 may automatically terminate the data stream.

The user NLU profiles 126b2 may generally include multiple user profiles that each indicate respective NLU service provider preferences (e.g., NLU service providers 132a-c) and respective NLU service preferences when transmitting data streams (or portions thereof) from the contact center 124 through to the cloud NLU connector 126, the secure network 128, the cloud-based NLU hub 130, and the NLU service providers 132a-c. The NLU service provider preferences included as part of the user NLU profiles 126b2 may indicate which NLU service providers 132a-c that are connected to the cloud-based NLU hub 130 a particular user prefers to have analyze data from the data streams transmitted to the cloud-based NLU hub 130 from the particular user's contact center. The NLU service preferences included as part of the user NLU profiles 126b2 may indicate which NLU services (e.g., textual transcription, intent interpretation, etc.) that are provided by the NLU service providers 132a-c a particular user prefers to have applied to analyze data from the data streams transmitted to the cloud-based NLU hub 130 from the particular user's contact center. Any user may have or include any suitable number of NLU service provider preferences and/or NLU service preferences, and the NLU service provider preferences and/or the NLU service preferences may include any suitable number of NLU service providers or NLU services.

For example, a first user NLU profile corresponding to a first user who administers a first contact center may indicate that data streams transmitted from the first contact center to the cloud-based NLU hub 130 should be analyzed by a first NLU service provider using a first NLU service and a second NLU service provider using a second NLU service. A second user NLU profile corresponding to a second user who administers a second contact center may indicate that data streams transmitted from the second contact center to the cloud-based NLU hub 130 should be analyzed by the first NLU service provider using the first NLU service and a third NLU service provider using the second NLU service. A third user NLU profile corresponding to a third user who administers a third contact center may indicate that data streams transmitted from the third contact center to the cloud-based NLU hub 130 should be analyzed by the second NLU service provider using the first NLU service and a fourth NLU service provider using the second NLU service. Thus, as indicated in the above example, users may prefer different NLU service providers to provide identical NLU services, users may prefer identical NLU service providers to provide different NLU services, users may prefer different NLU service provides to provide different NLU services, and/or any combination thereof.

In order to assist a user in determining respective NLU service provider preferences (e.g., NLU service providers 132*a-c*) and respective NLU service preferences, the cloud NLU connector may store a use-case catalog 126*b*3. The use-case catalog 126*b*3 generally includes a number of pre-configured preference sets of NLU service provider preferences and NLU service preferences that users may include as (or part of) their respective user NLU profile, depending on the user's specific use-case for the NLU functionality provided by the combination of the cloud NLU connector 126, cloud-based NLU hub 130, and NLU service providers 132*a-c*. The pre-configured preference sets may be developed/configured by the cloud NLU connector 126, the cloud-based NLU hub 130, and/or any other suitable processor or combinations thereof, and they may be stored in the memory 126*b* based on common preferences of users that have similar use-cases.

For example, a first user with a first use-case for the NLU functionality described herein may require a first NLU service and a second NLU service, and a second user with a second use-case may require the first NLU service and a third NLU service. The first use-case may have a corresponding first pre-configured preference set stored in the use-case catalog 126*b*3 recommending that the first user utilize a first NLU service provider for the first NLU service and a second NLU service provider for the second NLU service, as many prior/current users may utilize the NLU functionality described herein for an identical/similar use-case. Thus, the cloud NLU connector 126 may recommend the first pre-configured preference set to the first user when the first user is initially establishing a connection between the first user's contact center and the cloud NLU connector 126 and cloud-based NLU hub 130. The first user may accept the recommendation, and the cloud NLU connector 126 and/or the cloud-based NLU hub 130 may automatically store the first user's preferences as a first user profile in the user NLU profiles 126*b*2. Thereafter, when the first user's contact center transmits a data stream for analysis by the NLU service providers 132*a-c*, the cloud NLU connector 126 and/or the cloud-based NLU hub 130 may access the first user's profile, retrieve the first user's preferences, and utilize the first NLU service provider and the second NLU service provider accordingly.

Further, the use-case catalog 126*b*3 may also store prioritized and/or otherwise ranked lists of NLU service providers for certain NLU services. In particular, and in reference to the prior example, the second use-case may not have a corresponding pre-configured preference set stored in the use-case catalog 126*b*3, as few/no prior/current users may utilize the NLU functionality described herein for an identical/similar use-case. Nevertheless, the second user may indicate that the first NLU service and the third NLU service are required for the second use-case, and the cloud NLU connector 126 and/or the cloud-based NLU hub 130 may then recommend one or more NLU service providers for the first NLU service and the third NLU service based on the prioritized and/or otherwise ranked lists stored as part of the use-case catalog 126*b*3. The second user may review the lists from the use-case catalog 126*b*3 in order to make selections of NLU service providers for the first NLU service (e.g., a fourth NLU service provider) and the third NLU service (e.g., a third NLU service provider). Accordingly, the selected NLU service providers may be stored as part of a second user profile in the user NLU profiles 126*b*2. Thereafter, when the second user's contact center transmits a data stream for analysis by the NLU service providers 132*a-c*, the cloud NLU connector 126 and/or the cloud-based NLU hub 130 may access the second user's profile, retrieve the second user's preferences, and utilize the fourth NLU service provider for the first NLU service and the third NLU service provider for the third NLU service.

The encryption engine 126*b*4 may generally encrypt communications transmitted across the secure network 128. For example, the contact center 124 may route audio data from a data stream to the cloud NLU connector 126 for transmission to the cloud-based NLU hub 130. The cloud NLU connector 126 may receive the audio data from the contact center 124, encrypt the audio data using the encryption engine 126*b*4, and may subsequently transmit the encrypted audio data across the secure network to the cloud-based NLU hub 130. The encryption engine 126*b*4 may utilize any suitable encryption technique that enable the data received from the contact center 124 to transmit across the secure network 128 without data loss or corruption. This configuration overcomes certain security and data fidelity concerns experienced by conventional systems.

In particular, and as previously mentioned, conventional contact center systems are generally incapable of handling encrypted data across web-based communication channels without experiencing data loss and/or data corruption/mangling, which can interrupt or completely halt the user's interaction with a conventional contact center system. As a consequence, conventional contact center systems typically do not encrypt data received from a user, and thereby increase the security risk associated with transmitting unencrypted data across web-based communication channels.

By contrast, and in certain instances, the secure network 128 may utilize a WebSocket communication protocol, and the encryption engine 126*b*4 may encrypt the data received from the contact center 124 prior to transmission across the secure network 128. As previously mentioned, the WebSocket communication protocol provides full-duplex communication over a single transmission control protocol (TCP) connection/port, such that encrypted data transmitted using the WebSocket communication protocol can avoid data loss/fidelity issues with existing firewalls. Thus, the encryption engine 126*b*4 and secure network 128 of the present disclosure overcome both of these issues with conventional system by simultaneously minimizing the risk of data loss/corruption and maximizing data security.

The NIC 126*c* may include any suitable network interface controller(s), such as wired/wireless controllers (e.g., Ethernet controllers), and facilitate bidirectional/multiplexed networking over the secure network 128 between the cloud NLU connector 126 and other components of the environment 120 (e.g., cloud-based NLU hub 130, etc.).

In certain aspects, the contact center 124 and the cloud NLU connector 126 may both be stored on a contact center server 127. The contact center server 127 may be an individual server, a group (e.g., cluster) of multiple servers, or another suitable type of computing device or system (e.g., a collection of computing resources). In some embodiments, one or more components of the contact center server 127 may be embodied by one or more virtual instances (e.g., a cloud-based virtualization service). In such cases, one or more contact center server 127 may be included in a remote data center (e.g., a cloud computing environment, a public cloud, a private cloud, etc.). As such, in certain instances, the processing resources (e.g., processor 126*a*), modules/applications/engines (e.g., conversation engine 126*b*1, user NLU profiles 126*b*2, use-case catalog 126*b*3, encryption engine 126*b*4), and/or any other stored data/executable instructions may be distributed in various diverse computing environments. Thus, in these instances, any component of the server 127 may run/execute and/or be stored in various computing resources connected by the secure network 128.

The cloud-based NLU hub 130 may generally be a platform located on a cloud-based server or other storage location that is configured to receive data from the cloud NLU connector 126 across the secure network 128, and to transmit the received data to respective NLU service providers 132*a*-*c* for analysis. The cloud-based NLU hub 130 may include a processor 130*a*, a memory 130*b*, and a network interface controller 130*c*, similar to the corresponding components 126*a*-*c* of the cloud NLU connector 126. The memory 130*b* may store a conversation engine 130*b*1, user NLU profiles 130*b*2, a use-case catalog 130*b*3, and an encryption engine 130*b*4. Each of these applications/modules/engines 130*b*1-*b*4 may operate similarly to the corresponding applications/modules (e.g., 126*b*1-*b*4) stored in memory 126*b* of the cloud NLU connector 126, as described above.

When the cloud-based NLU hub 130 receives the data transmitted by the cloud NLU connector 126 across the secure network 128, the cloud-based NLU hub 130 may access the user NLU profiles 130*b*2 to determine how to process the data. In particular, the cloud-based NLU hub 130 may analyze the corresponding user NLU profile in order to determine which NLU service provider(s) 132*a*-*c* should receive the data (or portions thereof) in order to process the data in accordance with one or more NLU services. If there is no user NLU profile stored in the user NLU profiles 130*b*2, then the cloud-based NLU hub 130 may return a recommendation from the use-case catalog 130*b*3 in order to assist the user in establishing preferences to develop a user NLU profile. Regardless, when the cloud-based NLU hub 130 determines which NLU service providers 132*a*-*c* should receive the data for processing, the cloud-based NLU hub 130 may transmit the relevant data to the respective NLU service providers 132*a*-*c*.

The NLU service providers 132*a*, 132*b*, 132*c* may generally be NLU software platforms that are located on a cloud-based server or other storage location (e.g., same cloud-based server as the cloud-based NLU hub 130) and that are configured to execute NLU services on data received from the cloud-based NLU hub 130. The NLU service providers 132*a*-*c* may include computer-executable instructions for training, deploying, and/or otherwise operating NLU services. As illustrated in FIG. 1B, there may be any suitable number of NLU service providers 132*a*-*c*, such that NLU service provider N 132*c* may be the $N^{th}$ NLU service provider communicatively connected with the cloud-based NLU hub 130, where N is any integer value greater than or equal to 1.

The cloud-based NLU hub 130 may be connected to the NLU service providers 132*a*-*c* through an interface extension and/or other suitable connection that moderates communications between the cloud-based NLU hub 130 and the NLU service providers 132*a*-*c*. Thus, in certain aspects, the connections illustrated in FIG. 1B between the cloud-based NLU hub 130 and each of the NLU service providers 132*a*-*c* may represent the points at which peering occurs between the NLU service providers 132*a*-*c* and the cloud-based NLU hub 130. This direct peering/connection with the NLU service providers 132*a*-*c* enables the NLU service providers 132*a*-*c* to communicate with the cloud-based NLU hub 130 directly and consistently to provide the most up-to-date software versions that may be implemented on any of the NLU service providers 132*a*-*c* in a manner that was unachievable using conventional techniques. For example, NLU service provider B 132*b* may upload a patch for one or more of their NLU services at a first time, and the cloud-based NLU hub 130 may receive a request to utilize one or more of those patched NLU services of the NLU service provider B 132*b* at a second time that is after the first time. Because the cloud-based NLU hub 130 accesses the NLU service provider B 132*b* directly, the cloud-based NLU hub 130 may access the NLU service provider B 132*b* and cause NLU service provider B 132*b* to perform the one or more patched NLU services in accordance with the received request. In this manner, the cloud-based NLU hub 130 may always access the most current, up-to-date versions of the available NLU services from each of the NLU service providers 132*a*-*c*. Conventional techniques using on premise contact centers and legacy ASR engines (e.g., prior art contact center configuration 100) are simply not capable of providing such consistently updated services, forcing system administrators to manually apply updates, and frequently lag behind in processing capabilities as a result.

Broadly speaking, the NLU service providers 132*a*-*c* may each provide one or more NLU services through the training/deploying of NLU models (not shown) by, for example, establishing a network architecture, or topology, and adding layers that may be associated with one or more activation functions (e.g., a rectified linear unit, softmax, etc.), loss functions and/or optimization functions. Such training may generally be performed using a symbolic method, machine learning (ML) models, and/or any other suitable training method. As an example, the NLU service providers 132*a*-*c* may train the NLU models to perform at least two techniques that may enable the contact center 124, and/or any other suitable device to understand the words spoken by a user: syntactic analysis and semantic analysis.

Syntactic analysis generally involves analyzing text using basic grammar rules to identify overall sentence structure, how specific words within sentences are organized, and how the words within sentences are related to one another. Syntactic analysis may include one or more sub-tasks, such as tokenization, part of speech (PoS) tagging, parsing, lemmatization and stemming, stop-word removal, and/or any other suitable sub-task or combinations thereof. For example, using syntactic analysis, the NLU service providers 132*a*-*c* may generate textual transcriptions from the verbal responses from the user as part of the data stream.

Semantic analysis generally involves analyzing text in order to understand and/or otherwise capture the meaning of the text. In particular, the NLU service providers 132*a*-*c* applying semantic analysis may study the meaning of each individual word contained in a textual transcription in a process known as lexical semantics. Using these individual meanings, the NLU service providers 132*a*-*c* may then examine various combinations of words included in the sentences of the textual transcription to determine one or more contextual meanings of the words. Semantic analysis may include one or more sub-tasks, such as word sense disambiguation, relationship extraction, sentiment analysis, and/or any other suitable sub-tasks or combinations thereof. For example, using semantic analysis, the NLU service providers 132a-c may generate one or more intent interpretations based on one or more textual transcriptions from a syntactic analysis.

In certain aspects, one or more types of machine learning (ML) may be employed to by the NLU service providers 132a-c to train the NLU model(s). Further, in some aspects, the NLU model(s) may be one or more types of ML models. For example, artificial neural networks, recurrent neural networks, deep learning neural networks, a Bayesian model, and/or any other suitable ML model may be used to train and/or otherwise implement the NLU model(s). In these aspects, training may be performed by iteratively training the network using labeled training samples.

In instances where the NLU model(s) is an artificial neural network, training of the NLU model(s) may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction.

In embodiments, the one or more NLU models may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

In certain instances, the both the cloud-based NLU hub 130 and the NLU service providers 132a-c may generally be part of/located on a single cloud-based platform (e.g., the cloud-based NLU platform 134). By extension, the conversational engine 130b1, user NLU profiles 130b2, the use-case catalog 130b3, and the encryption engine 130b4 may also generally be included as part of the cloud-based NLU platform 134 that stores resources that are accessible by each user of the cloud platform 134. Of course, it should be understood that the cloud-based NLU platform 134 may be any suitable computing resource that includes a POP/peering location. For example, in certain instances, the cloud-based NLU platform 134 may be a public cloud platform, a private cloud platform, an internet accessible datacenter/colocation facility, and/or any other suitable platform.

The secure network 128 may be a single communication network, or may include multiple communication networks of one or more types (e.g., one or more wired and/or wireless local area networks (LANs), and/or one or more wired and/or wireless wide area networks (WANs) such as the Internet). The secure network 128 may enable bidirectional communication between the contact center server 127 and the cloud-based NLU hub 130, and/or between any other suitable devices described herein. The secure network 128 may operate using any suitable protocol that enables fully-duplexed communication between at least the contact center server 127 and the cloud-based NLU hub 130. For example, the secure network 128 may utilize WebSocket-based communications that adhere to the WebSocket communications protocol, and thereby enable the two-way ongoing conversation between the user using the user device 122 and the cloud-based NLU hub 130 and NLU service providers 132a-c.

The exemplary computing environment 120 may also include an external contact center platform 136 that connects to the cloud-based NLU hub 130 through the secure network 128 without use of the cloud NLU connector 126. More specifically, the external contact center platform 136 may be a contact-center-as-a-service (CCaaS) platform that does not have an internal/local NLU solution/capabilities. The external contact center platform 136 may connect to the cloud-based NLU hub 130 through the secure network 128 using any suitable connection/API, such as a secure representational state transfer (REST) type API (a "RESTful" API). As illustrated in FIG. 1B, the external contact center platform 136 is able to integrate to the cloud-based NLU hub 130, such that the platform 136 is able to access all of the NLU service providers 132a-c supported by cloud-based NLU hub 130. Thus, unlike conventional techniques, the configuration illustrated in FIG. 1B enables CCaaS platforms/providers to introduce NLU capabilities without forcing the CCaaS platforms/providers to support each NLU service provider 132a-c to their individual platform.

It should be appreciated that, as previously mentioned, the user's communication with the contact center 124 through the user device 122 is referenced herein as a telephone call for ease of discussion only. For example, the user may initiate a data stream using any suitable communication method, such as telephone, through a computer, smart phone/device, and such data streams may include audio, video, and/or any other suitable data and may include any other suitable manner of communication or combinations thereof.

Exemplary Method

Figure 2:
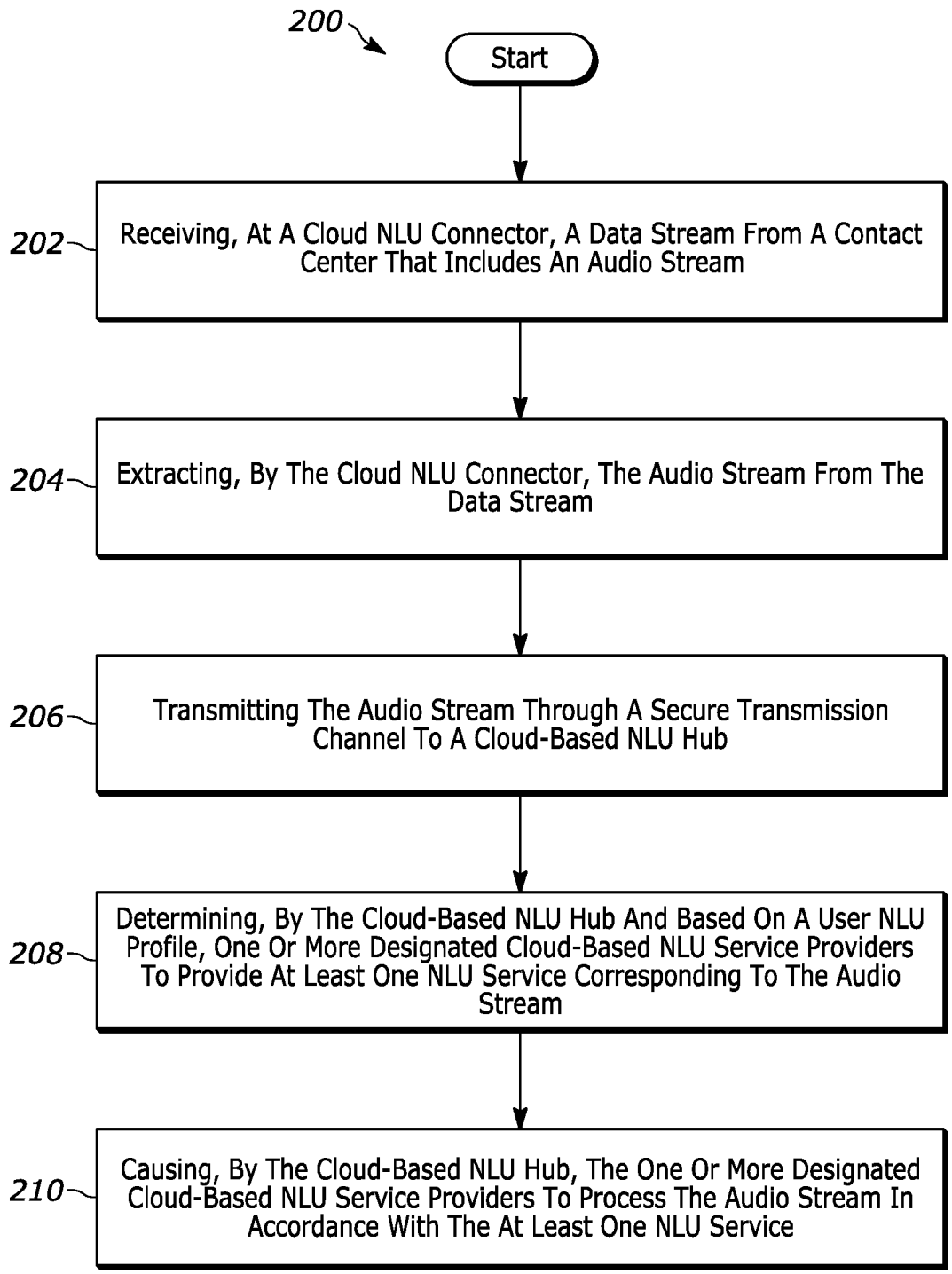
FIG. 2 is a flow diagram of an example method for providing natural language understanding (NLU) services to contact centers, in accordance with embodiments described herein.

FIG. 2 is a flow diagram of an example method 200 for providing natural language understanding (NLU) services to contact centers, in accordance with embodiments described herein. At least portions of the method 200 may be performed by one or more processors (e.g., one or more processors 126a, 130a) utilizing the embodiments of the cloud NLU connector 126, 204, the cloud-based NLU hub 130, 206, for example, or by other suitable modules or systems. In some aspects, the method 200 may include additional or alternate steps other than those described herein.

The example method 200 may include receiving, at a cloud NLU connector, a data stream from a contact center that includes an audio stream (block 202). In certain aspects, the method 200 may further include receiving, at the cloud NLU connector, the data stream from the contact center. In these aspects, the data stream may be a media resource control protocol (MRCP) data stream, and the MRCP data stream includes a request to the cloud NLU connector for NLU services. In other words, the data stream may include data (e.g., audio data) that conforms to the MRCP.

In some aspects, the method 200 may further include receiving, at the cloud NLU connector, the data stream from the contact center. Further in these aspects, the data stream is a session initiation protocol (SIP) data stream, and the SIP data stream includes a request to the cloud NLU connector to initiate a cloud-based interactive voice response (IVR) session. As an example, the data stream may include data (e.g., audio data) that conforms to the SIP, and the cloud NLU connector may initiate an IVR session that provides automatic prompts/queries to the user. The user may thereby access information via the automatic prompts/queries without having to speak to a human agent, and may utilize menu options via touch tone keypad selection or speech recognition through an input device (e.g., input device 122*a*) of the user device (e.g., user device 122).

In certain aspects, the method 200 further includes receiving, at the cloud NLU connector, the data stream from the contact center. In these aspects, the contact center is a session border controller (SBC) that routes the SIP data stream to the cloud NLU connector.

The method 200 may further include extracting, by the cloud NLU connector, the audio stream from the data stream (block 204). The method 200 may also include transmitting the audio stream through a secure network to a cloud-based NLU hub (block 206). The cloud-based NLU hub may be communicatively coupled to a plurality of cloud-based NLU service providers (e.g., NLU service providers 132*a*-*c*) and may store a plurality of user NLU profiles (e.g., user NLU profiles 130*b*2) that each designate one or more cloud-based NLU service providers of the plurality of cloud-based NLU service providers to provide NLU services.

In certain aspects, the method 200 may further include encrypting, by the cloud NLU connector, the audio stream with a private internet protocol (IP) address. In these aspects, the method 200 may also include transmitting the encrypted audio stream through the secure network to the cloud-based NLU hub.

The method 200 may further include determining, by the cloud-based NLU hub and based on a user NLU profile of the plurality of user NLU profiles, one or more designated cloud-based NLU service providers of the plurality of cloud-based NLU service providers to provide at least one NLU service corresponding to the audio stream (block 208). In certain aspects, the cloud-based NLU hub further comprises a use-case catalog (e.g., use-case catalog 130*b*3) that includes a plurality of NLU service provider service configurations, as described herein. Further in these aspects, the method 200 may include recommending, by the cloud-based NLU hub, an NLU service provider service configuration from the use-case catalog to a user in response to a user initially connecting a contact center to the cloud-based NLU hub through the cloud NLU connector.

The method 200 may further include causing, by the cloud-based NLU hub, the one or more designated cloud-based NLU service providers to process the audio stream in accordance with the at least one NLU service (block 210). In certain instances, the method 200 may further include receiving, at the cloud-based NLU hub, a user request to modify a respective user profile. Further in these aspects, the method 200 may include adjusting within the respective user profile, and based on the user request, (i) a designated cloud-based NLU service provider of the plurality of cloud-based NLU service providers to a different cloud-based NLU service provider of the plurality of cloud-based NLU service providers, or (ii) an NLU service provided by the designated cloud-based NLU service provider to a different NLU service provided by the designated cloud-based NLU service provider.

ASPECTS OF THE DISCLOSURE

1. A system for providing natural language understanding (NLU) services to contact centers, the system comprising: a cloud NLU connector configured to: receive a data stream from a contact center that includes an audio stream, extract the audio stream from the data stream, and transmit the audio stream through a secure network; and a cloud-based NLU hub that is communicatively coupled to a plurality of cloud-based NLU service providers and stores a plurality of user NLU profiles that each designate one or more cloud-based NLU service providers of the plurality of cloud-based NLU service providers to provide NLU services, wherein the cloud-based NLU hub is configured to: receive the audio stream through the secure network, determine, based on a user NLU profile of the plurality of user NLU profiles, one or more designated cloud-based NLU service providers of the plurality of cloud-based NLU service providers to provide at least one NLU service corresponding to the audio stream, and cause the one or more designated cloud-based NLU service providers to process the audio stream in accordance with the at least one NLU service.

2. The system of aspect 1, wherein the cloud NLU connector is further configured to: receive the data stream from the contact center, wherein the data stream is a media resource control protocol (MRCP) data stream, and the MRCP data stream includes a request to the cloud NLU connector for NLU services.

3. The system of any of aspects 1-2, wherein the cloud NLU connector is further configured to: receive the data stream from the contact center, wherein the data stream is a session initiation protocol (SIP) data stream, and the SIP data stream includes a request to the cloud NLU connector to initiate a cloud-based interactive voice response (IVR) session.

4. The system of aspect 3, wherein the cloud NLU connector is further configured to: receive the data stream from the contact center, wherein the contact center is a session border controller (SBC) that routes the SIP data stream to the cloud NLU connector.

5. The system of any of aspects 1-4, wherein the cloud NLU connector is further configured to: encrypt the audio stream with a private internet protocol (IP) address, and transmit the encrypted audio stream through the secure network.

6. The system of any of aspects 1-5, wherein the cloud-based NLU hub further comprises a use-case catalog that includes a plurality of NLU service provider service configurations, and the cloud-based NLU hub is further configured to: recommend an NLU service provider service configuration from the use-case catalog to a user in response to a user initially connecting a contact center to the cloud-based NLU hub through the cloud NLU connector.

7. The system of any of aspects 1-6, wherein the cloud-based NLU hub is further configured to: receive a user request to modify a respective user profile, and adjust within the respective user profile, based on the user request, (i) a designated cloud-based NLU service provider of the plurality of cloud-based NLU service providers to a different cloud-based NLU service provider of the plurality of cloud-based NLU service providers, or (ii) an NLU service provided by the designated cloud-based NLU service provider to a different NLU service provided by the designated cloud-based NLU service provider.

8. A method for providing natural language understanding (NLU) services to contact centers, the method comprising: receiving, at a cloud NLU connector, a data stream from a contact center that includes an audio stream; extracting, by the cloud NLU connector, the audio stream from the data stream; transmitting the audio stream through a secure network to a cloud-based NLU hub, wherein the cloud-based NLU hub is communicatively coupled to a plurality of cloud-based NLU service providers and stores a plurality of user NLU profiles that each designate one or more cloud-based NLU service providers of the plurality of cloud-based NLU service providers to provide NLU services; determining, by the cloud-based NLU hub and based on a user NLU profile of the plurality of user NLU profiles, one or more designated cloud-based NLU service providers of the plurality of cloud-based NLU service providers to provide at least one NLU service corresponding to the audio stream; and causing, by the cloud-based NLU hub, the one or more designated cloud-based NLU service providers to process the audio stream in accordance with the at least one NLU service.

9. The method of aspect 8, further comprising: receiving, at the cloud NLU connector, the data stream from the contact center, wherein the data stream is a media resource control protocol (MRCP) data stream, and the MRCP data stream includes a request to the cloud NLU connector for NLU services.

10. The method of any of aspects 8-9, further comprising: receiving, at the cloud NLU connector, the data stream from the contact center, wherein the data stream is a session initiation protocol (SIP) data stream, and the SIP data stream includes a request to the cloud NLU connector to initiate a cloud-based interactive voice response (IVR) session.

11. The method of aspect 10, further comprising: receiving, at the cloud NLU connector, the data stream from the contact center, wherein the contact center is a session border controller (SBC) that routes the SIP data stream to the cloud NLU connector.

12. The method of any of aspects 8-11, further comprising: encrypting, by the cloud NLU connector, the audio stream with a private internet protocol (IP) address; and transmitting the encrypted audio stream through the secure network to the cloud-based NLU hub.

13. The method of any of aspects 8-12, wherein the cloud-based NLU hub further comprises a use-case catalog that includes a plurality of NLU service provider service configurations, and the method further comprises: recommending, by the cloud-based NLU hub, an NLU service provider service configuration from the use-case catalog to a user in response to a user initially connecting a contact center to the cloud-based NLU hub through the cloud NLU connector.

14. The method of any of aspects 8-13, further comprising: receiving, at the cloud-based NLU hub, a user request to modify a respective user profile; and adjusting within the respective user profile, based on the user request, (i) a designated cloud-based NLU service provider of the plurality of cloud-based NLU service providers to a different cloud-based NLU service provider of the plurality of cloud-based NLU service providers, or (ii) an NLU service provided by the designated cloud-based NLU service provider to a different NLU service provided by the designated cloud-based NLU service provider.

15. A non-transitory, computer-readable medium storing instructions thereon for providing natural language understanding (NLU) services to contact centers, the instructions comprising: instructions for receiving a data stream from a contact center that includes an audio stream; instructions for extracting the audio stream from the data stream; instructions for transmitting the audio stream through a secure network to a cloud-based NLU hub that is communicatively coupled to a plurality of cloud-based NLU service providers and stores a plurality of user NLU profiles that each designate one or more cloud-based NLU service providers of the plurality of cloud-based NLU service providers to provide NLU services; instructions for determining, based on a user NLU profile of the plurality of user NLU profiles, one or more designated cloud-based NLU service providers of the plurality of cloud-based NLU service providers to provide at least one NLU service corresponding to the audio stream; and instructions for causing the one or more designated cloud-based NLU service providers to process the audio stream in accordance with the at least one NLU service.

16. The non-transitory, computer-readable medium of aspect 15, wherein the instructions further comprise: instructions for receiving the data stream from the contact center, wherein the data stream is a media resource control protocol (MRCP) data stream, and the MRCP data stream includes a request to the cloud NLU connector for NLU services.

17. The non-transitory, computer-readable medium of any of aspects 15-16, wherein the instructions further comprise: instructions for receiving the data stream from the contact center, wherein the data stream is a session initiation protocol (SIP) data stream, and the SIP data stream includes a request to the cloud NLU connector to initiate a cloud-based interactive voice response (IVR) session.

18. The non-transitory, computer-readable medium of aspect 17, wherein the instructions further comprise: instructions for receiving the data stream from the contact center, wherein the contact center is a session border controller (SBC) that routes the SIP data stream to the cloud NLU connector.

19. The non-transitory, computer-readable medium of any of aspects 15-18, wherein the instructions further comprise: instructions for encrypting the audio stream with a private internet protocol (IP) address; and transmit the encrypted audio stream through the secure network.

20. The non-transitory, computer-readable medium of any of aspects 15-19, wherein the cloud-based NLU hub further comprises a use-case catalog that includes a plurality of NLU service provider service configurations, and wherein the instructions further comprise: instructions for recommending an NLU service provider service configuration from the use-case catalog to a user in response to a user initially connecting a contact center to the cloud-based NLU hub through the cloud NLU connector.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A system for providing natural language understanding (NLU) services to contact centers, the system comprising:
    a cloud NLU connector configured to:
        receive a data stream from a contact center that includes an audio stream,
        extract the audio stream from the data stream, and
        transmit the audio stream through a secure network; and
    a cloud-based NLU hub that is communicatively coupled to a plurality of cloud-based NLU service providers and stores a plurality of user NLU profiles that each designate one or more cloud-based NLU service providers of the plurality of cloud-based NLU service providers to provide NLU services, wherein the cloud-based NLU hub is configured to:
        receive the audio stream through the secure network,
        determine, based on a user NLU profile of the plurality of user NLU profiles, one or more designated cloud-based NLU service providers of the plurality of cloud-based NLU service providers to provide at least one NLU service corresponding to the audio stream, and
        cause the one or more designated cloud-based NLU service providers to process the audio stream in accordance with the at least one NLU service.

2. The system of claim 1, wherein the cloud NLU connector is further configured to:
    receive the data stream from the contact center, wherein the data stream is a media resource control protocol (MRCP) data stream, and the MRCP data stream includes a request to the cloud NLU connector for NLU services.

3. The system of claim 1, wherein the cloud NLU connector is further configured to:
    receive the data stream from the contact center, wherein the data stream is a session initiation protocol (SIP) data stream, and the SIP data stream includes a request to the cloud NLU connector to initiate a cloud-based interactive voice response (IVR) session.

4. The system of claim 3, wherein the cloud NLU connector is further configured to:
    receive the data stream from the contact center, wherein the contact center is a session border controller (SBC) that routes the SIP data stream to the cloud NLU connector.

5. The system of claim 1, wherein the cloud NLU connector is further configured to:
    encrypt the audio stream with a private internet protocol (IP) address, and
    transmit the encrypted audio stream through the secure network.

6. The system of claim 1, wherein the cloud-based NLU hub further comprises a use-case catalog that includes a plurality of NLU service provider service configurations, and the cloud-based NLU hub is further configured to:
    recommend an NLU service provider service configuration from the use-case catalog to a user in response to a user initially connecting the contact center to the cloud-based NLU hub through the cloud NLU connector.

7. The system of claim 1, wherein the cloud-based NLU hub is further configured to:
receive a user request to modify a respective user profile, and
adjust within the respective user profile, based on the user request, (i) a designated cloud-based NLU service provider of the plurality of cloud-based NLU service providers to a different cloud-based NLU service provider of the plurality of cloud-based NLU service providers, or (ii) an NLU service provided by the designated cloud-based NLU service provider to a different NLU service provided by the designated cloud-based NLU service provider.

8. A method for providing natural language understanding (NLU) services to contact centers, the method comprising:
receiving, at a cloud NLU connector, a data stream from a contact center that includes an audio stream;
extracting, by the cloud NLU connector, the audio stream from the data stream;
transmitting the audio stream through a secure network to a cloud-based NLU hub, wherein the cloud-based NLU hub is communicatively coupled to a plurality of cloud-based NLU service providers and stores a plurality of user NLU profiles that each designate one or more cloud-based NLU service providers of the plurality of cloud-based NLU service providers to provide NLU services;
determining, by the cloud-based NLU hub and based on a user NLU profile of the plurality of user NLU profiles, one or more designated cloud-based NLU service providers of the plurality of cloud-based NLU service providers to provide at least one NLU service corresponding to the audio stream; and
causing, by the cloud-based NLU hub, the one or more designated cloud-based NLU service providers to process the audio stream in accordance with the at least one NLU service.

9. The method of claim 8, further comprising:
receiving, at the cloud NLU connector, the data stream from the contact center, wherein the data stream is a media resource control protocol (MRCP) data stream, and the MRCP data stream includes a request to the cloud NLU connector for NLU services.

10. The method of claim 8, further comprising:
receiving, at the cloud NLU connector, the data stream from the contact center, wherein the data stream is a session initiation protocol (SIP) data stream, and the SIP data stream includes a request to the cloud NLU connector to initiate a cloud-based interactive voice response (IVR) session.

11. The method of claim 10, further comprising:
receiving, at the cloud NLU connector, the data stream from the contact center, wherein the contact center is a session border controller (SBC) that routes the SIP data stream to the cloud NLU connector.

12. The method of claim 8, further comprising:
encrypting, by the cloud NLU connector, the audio stream with a private internet protocol (IP) address; and
transmitting the encrypted audio stream through the secure network to the cloud-based NLU hub.

13. The method of claim 8, wherein the cloud-based NLU hub further comprises a use-case catalog that includes a plurality of NLU service provider service configurations, and the method further comprises:

recommending, by the cloud-based NLU hub, an NLU service provider service configuration from the use-case catalog to a user in response to a user initially connecting the contact center to the cloud-based NLU hub through the cloud NLU connector.

14. The method of claim 8, further comprising:
receiving, at the cloud-based NLU hub, a user request to modify a respective user profile; and
adjusting within the respective user profile, based on the user request, (i) a designated cloud-based NLU service provider of the plurality of cloud-based NLU service providers to a different cloud-based NLU service provider of the plurality of cloud-based NLU service providers, or (ii) an NLU service provided by the designated cloud-based NLU service provider to a different NLU service provided by the designated cloud-based NLU service provider.

15. A non-transitory, computer-readable medium storing instructions thereon for providing natural language understanding (NLU) services to contact centers, the instructions comprising:
instructions for receiving a data stream from a contact center that includes an audio stream;
instructions for extracting the audio stream from the data stream;
instructions for transmitting the audio stream through a secure network to a cloud-based NLU hub that is communicatively coupled to a plurality of cloud-based NLU service providers and stores a plurality of user NLU profiles that each designate one or more cloud-based NLU service providers of the plurality of cloud-based NLU service providers to provide NLU services;
instructions for determining, based on a user NLU profile of the plurality of user NLU profiles, one or more designated cloud-based NLU service providers of the plurality of cloud-based NLU service providers to provide at least one NLU service corresponding to the audio stream; and
instructions for causing the one or more designated cloud-based NLU service providers to process the audio stream in accordance with the at least one NLU service.

16. The non-transitory, computer-readable medium of claim 15, wherein the instructions further comprise:
instructions for receiving the data stream from the contact center, wherein the data stream is a media resource control protocol (MRCP) data stream, and the MRCP data stream includes a request to a cloud NLU connector for NLU services.

17. The non-transitory, computer-readable medium of claim 15, wherein the instructions further comprise:
instructions for receiving the data stream from the contact center, wherein the data stream is a session initiation protocol (SIP) data stream, and the SIP data stream includes a request to a cloud NLU connector to initiate a cloud-based interactive voice response (IVR) session.

18. The non-transitory, computer-readable medium of claim 17, wherein the instructions further comprise:
instructions for receiving the data stream from the contact center, wherein the contact center is a session border controller (SBC) that routes the SIP data stream to the cloud NLU connector.

19. The non-transitory, computer-readable medium of claim 15, wherein the instructions further comprise:
instructions for encrypting the audio stream with a private internet protocol (IP) address; and
instructions for transmitting the encrypted audio stream through the secure network.

20. The non-transitory, computer-readable medium of claim 15, wherein the cloud-based NLU hub further comprises a use-case catalog that includes a plurality of NLU service provider service configurations, and wherein the instructions further comprise:

instructions for recommending an NLU service provider service configuration from the use-case catalog to a user in response to a user initially connecting the contact center to the cloud-based NLU hub through a cloud NLU connector.

\* \* \* \* \*